United States Patent [19]

Hoelzer

[11] Patent Number: 4,649,870

[45] Date of Patent: Mar. 17, 1987

[54] METHOD AND APPARATUS FOR IMPROVING LUBRICANT SEAL LIFE

[75] Inventor: James C. Hoelzer, Racine, Wis.

[73] Assignee: J. I. Case Company, Racine, Wis.

[21] Appl. No.: 855,177

[22] Filed: Apr. 24, 1986

[51] Int. Cl.4 ............................................. F01M 13/00
[52] U.S. Cl. ............................ 123/41.86; 123/196 CP; 277/152; 277/DIG. 4
[58] Field of Search .......... 123/41.86, 196 R, 196 CP, 123/572; 277/3, 152, DIG. 4

[56] References Cited

U.S. PATENT DOCUMENTS

| | | | |
|---|---|---|---|
| 2,118,633 | 5/1938 | White | 123/572 |
| 2,781,632 | 2/1957 | Meijer | 123/196 CP |
| 2,902,012 | 9/1959 | Malcolm | 123/41.86 |
| 3,123,060 | 3/1964 | Daigh | 123/572 |
| 3,418,986 | 12/1968 | Scherenberg | 123/41.86 |
| 4,134,596 | 1/1979 | Kawai | 277/DIG. 4 |
| 4,404,936 | 9/1983 | Tatebe et al. | 123/196 R |
| 4,470,389 | 9/1984 | Mitadera et al. | 123/196 CP |
| 4,527,520 | 7/1985 | Koch | 123/196 R |

Primary Examiner—William A. Cuchlinski, Jr.
Attorney, Agent, or Firm—Peter N. Jansson

[57] ABSTRACT

A method and apparatus for improving the life of a lubricant seal located around a movable shaft where it exits a fluid-containing housing on a vehicle with an internal combustion engine having a crankcase. The invention includes removing blowby, which contains lubricating oil mist, from the crankcase and channeling it into contact with the outside surface of the lubricant seal. The apparatus and method of this invention also involve isolating the lubricant seal from dust and dirt.

12 Claims, 2 Drawing Figures

METHOD AND APPARATUS FOR IMPROVING LUBRICANT SEAL LIFE

FIELD OF THE INVENTION

This invention is related generally to seals for fluid-containing housings and, more particularly, to methods and apparatus for improving the life of lubricant seals on fluid-containing housings of internal combustion engines.

BACKGROUND OF THE INVENTION

Lubricant seals which are located around moveable shafts at the points they exit fluid-containing housings must be in good condition to function properly. This is particularly true for lubricant seals on internal combustion engines, such as the crankshaft seal. Such seals must be in good condition for trouble-free operation of vehicles. Undue wear, drying and cracking of seals can result in leakage of fluids from the crankcase or other housings and even lead to increased wear of internal moving parts.

Therefore, seals are frequently changed. But changing lubricant seals, particularly crankcase seals, can be a time-consuming and troublesome operation. For certain type of work vehicles, such as tractors, road graders and the like, which are typically exposed to a significant amount of dust, dirt and grit in their normal operation, such seals must be changed as often as two or three times before a general overhaul of the crankcase parts is required. In an ideal situation, of course, such seals would require changing only at the time a general overhaul is required.

Lubricant seals of the type located around movable shafts where they exit fluid-containing housings undergo degradation and wear. Such seals are typically made of rubber, neoprene, a synthetic material known as Viton (a Dupont trademark), or leather, or a variety of other suitable materials. The inside surfaces of such lubricant seals are in contact with fluid within the housings on which they are mounted, but the outside surfaces are typically in contact with the often very dirty environment in which the equipment is operating. Thus, while the fluid in the housing can serve to preserve the inside surfaces of such seals, the outside surfaces have no preserving fluid in contact with them. The outside surfaces are much more susceptible to drying, cracking and other degradation, whether such degradation occurs because of heat, dryness, or a combination thereof.

Drying of the outside surface of the seal results in an accelerated wear of the seal. Furthermore, over a period of time a hardened seal can cause wear on the shaft turning or reciprocating within such seal.

In addition, the outside surface and the seal edge in contact with the shaft exiting the fluid-containing housing are exposed to dust, dirt and grit. This is particularly true for crankcase seals on farm tractors, construction vehicles, and road-building equipment, all of which frequently operate in a dusty environment.

Such dirt can cause a roughness in the contact between the seal and a rotating or reciprocating shaft and such roughness can wear grooves in the shaft. Such grooves can in themselves cause wear or unevenness of wear on the seal (or a subsequently installed seal) and lead an early need for seal replacement.

In short, there is a need to improve the life of lubricant seals of the type around movable shafts where such shafts exit their fluid-containing housings. In particular, there is a need to improve the life of lubricant seals on crankcases or internal combustion engines.

SUMMARY OF THE INVENTION

This invention is a method and apparatus for improving the life of lubricant seals of the type located around movable shafts where they exit fluid-containing housings. More particularly, the method and apparatus of this invention improve the life of seals on crankcases and other housings on internal combustion engines. The method and apparatus of this invention thus overcome certain problems of the prior art, including those mentioned above.

The method of this invention involves removing blowby from the crankcase of an internal combustion engine and channeling such blowby into contact with the outside surface of a lubricant seal located around a movable shaft where it exits a fluid-containing housing on a vehicle with an internal combustion engine. It is known that blowby contains an oil mist. The apparatus and method of this invention use such mist to improve the life of lubricant seals.

The apparatus of this invention includes an enclosure which is formed against the fluid-containing housing in position around the lubricant seal. The enclosure has a blowby inlet and a blowby outlet, and blowby is continuously moved into and out of the enclosure to bathe the outside surface of the lubricant seal with the lubricating oil mist.

In preferred embodiments of this invention, the crankcase seal is itself protected. However, seals on steering cylinders, water pumps, or any working or lifting cylinders can be preserved using the method and apparatus of this invention. Appropriate channeling apparatus and housing-adjacent enclosures are, of course, necessary.

Under certain government regulations applying to certain types of internal combustion engines, blowby must be re-entered into the combustion cylinders for reburning of certain gases. Therefore, a variety of devices for channeling blowby from the outlets of crankcases are known. And, it is also noted that blowby from crankcases has been channeled to various engine parts for various purposes. The following U.S. patents are some examples:

U.S. Pat. No. 2,118,633 (White)
U.S. Pat. No. 2,781,632 (Meijer)
U.S. Pat. No. 3,123,060 (Daigh)
U.S. Pat. No. 4,404,936 (Tatebe et al.)
U.S. Pat. No. 4,527,520 (Koch)

The prior art fails to teach or suggest the use of blowby for any purpose relating to improving the life of lubricant seals.

The apparatus and method of this invention serve to shield the lubricant seals from dirt, dust and grit. The enclosure adjacent to the outside surface of such a lubricant seal physically isolates such seal from such dust, dirt and grit.

In preferred embodiments, this protective function is enhanced by maintaining the pressure within such enclosure at or above ambient pressures. A preferred means for accomplishing this end is to have the blowby inlet of such enclosure at least as large as the blowby outlet from such enclosure. Preferably, the outlet restriction serves to maintain the pressure within the enclosure at an above-ambient level.

The enclosure has an opening through which the rotating (or in some cases reciprocating) shaft passes. As long as the pressure within the enclosure is higher than or at least equal to the pressure outside such enclosure dirt will not be encouraged to pass through the shaft opening in the housing. An inexpensive and easily-replaceable seal may be placed against such housing to cover such opening, and this can further protect the lubricant seal from dust, dirt and grit.

OBJECTS OF THE INVENTION

It is an object of this invention to provide a method and apparatus for improving the life of lubricant seals of the type located around movable (either rotating or reciprocating) shafts where they exit their fluid-containing housings on internal combustion engines.

Another object of this invention is to provide a method and apparatus extending the useful life of lubricant seals.

Another object of this invention is to provide a method and apparatus protecting lubricant seals from drying, hardening, cracking and/or other forms of degradation which limit their useful lives.

Another object of this invention is to provide a method and apparatus for protecting lubricant seals from excessive dust, dirt and grit.

Another object of this invention is to provide a method and apparatus for effective use of fluids available in internal combustion engines to improve the lives of lubricant seals on such engines.

These and other objects will be apparent from the following additional descriptions and from the drawings, wherein:

DETAILED DESCRIPTIONS OF PREFERRED EMBODIMENTS

Figure 1:
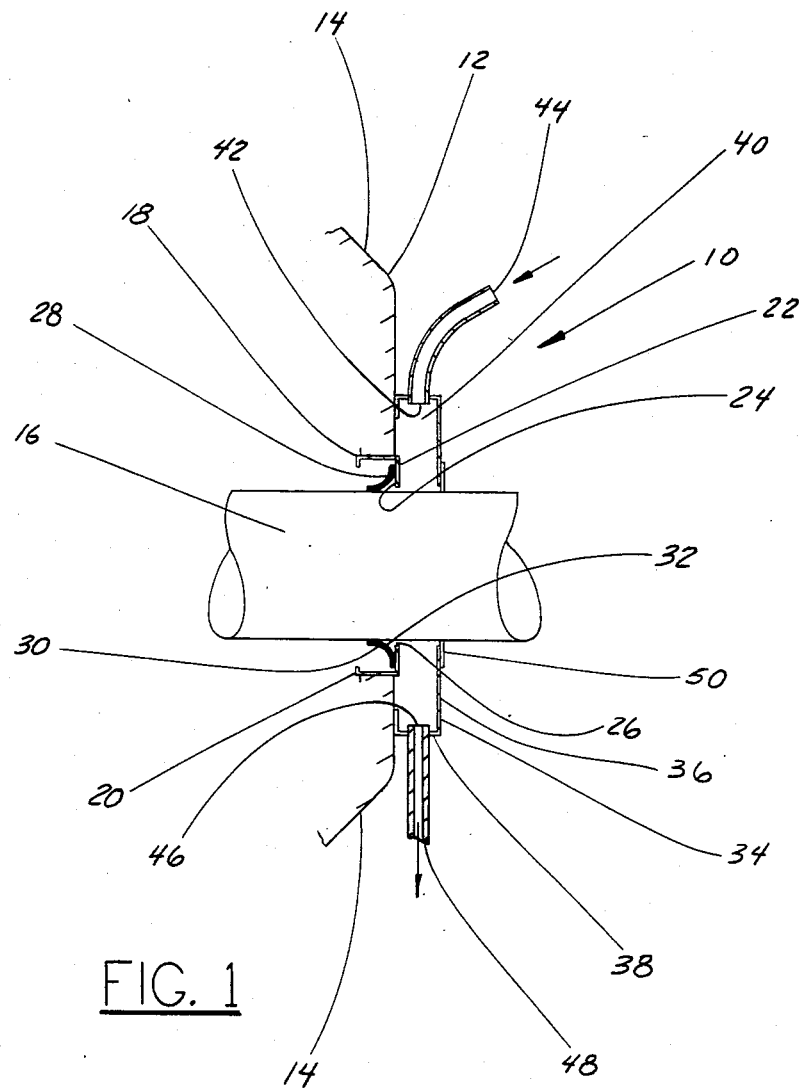
FIG. 1 is a side sectional view of the apparatus of this invention.

The figures illustrate a seal-protecting device 10 mounted on a face 12 of a front gear housing which forms part of the crankcase assembly 14 on an internal combustion engine. A rotating shaft 16 exits crankcase 14 through a seal assembly 18. Seal-protecting apparatus 10 forms an enclosure against face 12, which, as noted, is part of crank-case assembly 14.

Seal assembly 18 includes an outer sleeve 20 which has a radial portion 22. Radial portion 22 has an inner surface 24 defining an opening through which shaft 16 passes. There is an annular space 26 between radial portion 22 and shaft 16. Main seal 28 is secured at its upper edge to inner surface 24 of radial portion 22 and extends inwardly to a seal-engaging edge. Main seal 28 includes an inside surface 30 and an outside surface 32. Inside surface 30 of main seal 28 is in contact with the oil within crankcase 14. Outside surface 32 is in communication with the outside through space 26 between shaft 16 and radial portion 22 of outer sleeve 20.

Seal-protecting device 10 is a blowby housing 34 which forms an enclosure against space 12 of crankcase 14, as previously noted. Blowby housing 34 includes an annular front wall 36, which is generally parallel to face 12 of crankcase assembly 14, and an annular edge wall 38 extending from the edge of front wall 30 to face 12. Blowby housing 34 encloses a volume 40 which is contiguous with space 26 such that volume 40 communicates with outside surface 32 of main seal 28.

Blowby housing 34 has an intake 42 in edge wall 38. Feed tube 44 is connected to edge wall 38 at intake 42. Likewise, blowby housing 34 has an outlet 46 which is formed in edge wall 38, and an exhaust tube 48 is attached to edge wall 38 at outlet 46. Feed tube 44 is part of a means to remove blowby from the crankcase. This may be accomplished in a known manner through orifices and channeling illustrated schematically in FIG. 2, including line 53 attached to crankcase sidewall 52, and feed tube 44. The flow of blowby in feed tube 44 is in the direction indicated by the arrow.

Blowby enters volume 40 through intake 42. Such blowby contains a oil mist. Such oil mist in volume 40 passes through space 26 and is freely in contact with outside surface 32 of lubricant seal 28.

As additional blowby enters volume 40, blowby within volume 40 exits volume 40 through outlet 46 and feed tube 44. Intake 42 is larger than outlet 46. Outlet 46 is preferably smaller than inlet 42. Such configuration is for the purpose of maintaining a pressure within volume 40 which is equal to or greater than ambient. As previously noted, this helps prevent the ingress of dust, dirt and the like into volume 40, and thus provides additional protection for main seal 28.

Figure 2:
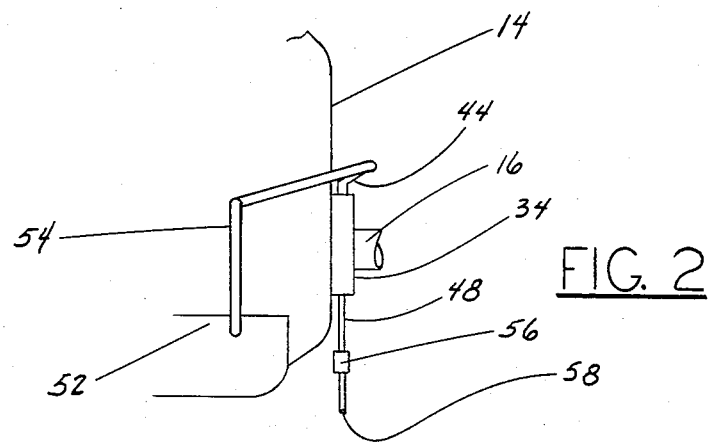
FIG. 2 is a schematic view.

As illustrated in FIG. 2, a double check valve 56 can be placed within the blowby exit line. Valve 56 operates to allow the exitting of blowby only when the pressure within housing 34 reach a pre-set level. And, if the headspace pressure in the crankcase gets substantially below ambient, as can occasionally occur, valve 56 can open.

Annular front wall 36 has an opening through which shaft 16 passes. An inexpensive and easily-replaceable seal 50 may be applied to annular front wall 36 to further prevent the ingress of dust and dirt into volume 40.

The method and apparatus of this invention serve to improve the life of lubricant seals in a number of ways. They provide a constant oil mist on the outside surface of a lubricant seal to minimize drying and cracking. They also serve to isolate the lubricant seals from dust and dirt and the like. Finally, it should also be noted that the method and apparatus of this invention have a tendency to improve the uniformity of the temperature environment on opposite sides of the lubricant seal.

A variety of well-known and easily-available materials and parts can be used in making the apparatus of this invention.

While the principles of this invention have been described in connection with specific embodiments, it should be understood clearly that these descriptions are made only by way of example and are not intended to limit the scope of the invention.

What is claimed:

1. A method for improving the life of a lubricant seal located around a movable shaft where it exits a fluid-containing housing, on a vehicle with an internal combustion engine having a crankcase, said seal having an inside surface in contact with fluid within said housing and an opposite outside surface, including:

removing blowby from the crankcase, said blowby containing lubricating oil mist; and channeling the blowby into contact with the outside surface of the lubricant seal.

2. The method of claim 1 wherein the housing is said crankcase.

3. The method of claim 1 wherein a blowby containment vessel is against the housing about said seal, the channeling of blowby being through the containment vessel.

4. The method of claim 3 wherein the housing is said crankcase.

5. The method of claim 3 further comprising the step of maintaining the pressure within the vessel at ambient or above to minimize ingress of dirt.

6. The method of claim 5 wherein the housing is said crankcase.

7. Apparatus for improving the life of a lubricant seal located around a movable shaft where it exits a fluid-containing housing, on a vehicle with an internal combustion engine having a crankcase, said seal having inside surface in contact with fluid within said housing and an opposite outside surface, including:

means removing blowby from the crankcase, said blowby containing lubricating oil mist; and
   means to channel the blowby into contact with the outside surface of the lubricant seal.

8. The apparatus of claim 7 wherein the housing is said crankcase.

9. The apparatus of claim 7 wherein the channeling means comprises an enclosure formed against the fluid-containing housing around said lubricant seal, said enclosure having a blowby inlet and a blowby outlet.

10. The apparatus of claim 9 wherein the housing is said crankcase.

11. The apparatus of claim 9 wherein the inlet is at least as large as the outlet, such that the pressure within the enclosure is generally at ambient or above to minimize ingress of dirt.

12. The apparatus of claim 11 wherein the housing is said crankcase.

* * * * *